Figure 1:
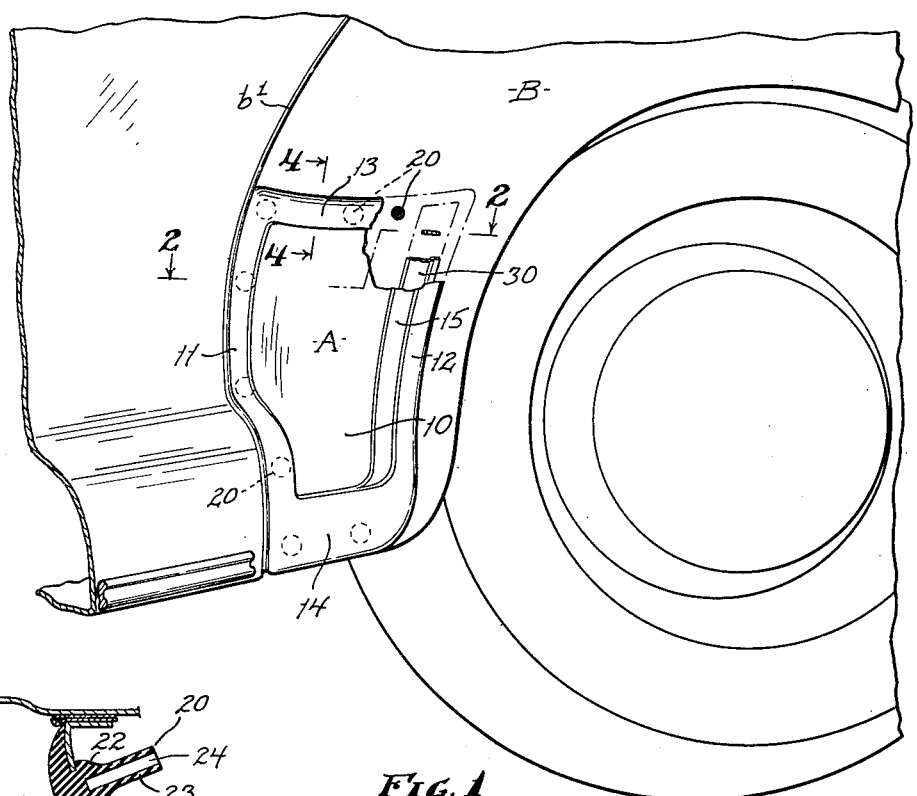

Jan. 30, 1945. G. F. CAVANAGH 2,368,200
PROTECTING PAD FOR AUTOMOBILE FENDERS
Filed Jan. 19, 1942 2 Sheets-Sheet 2

INVENTOR.
Gerald F. Cavanagh,
BY Bates, Teare & McKee,
Attorneys.

Patented Jan. 30, 1945

2,368,200

UNITED STATES PATENT OFFICE 2,368,200

PROTECTING PAD FOR AUTOMOBILE FENDERS

Gerald F. Cavanagh, Euclid, Ohio

Application January 19, 1942, Serial No. 427,269

5 Claims. (Cl. 280—153)

This invention relates to a cover or surface guard adapted to protect the forward surface of the rear fender of an automobile adjacent the bottom of such fender, the protector being especially useful in preventing abrasion or injury to the fender by stones or grit thrown from the road against it or by impact of a passenger's foot in entering the rear compartment of the car.

The present invention is an improvement on the construction shown in my pending application No. 325,200, filed March 21, 1940, becoming Patent No. 2,270,266 on January 20, 1942, and reference is made to that patent for claims dominating the present improvement.

Objects of the present invention are to strengthen the device without interfering with its flexibility, and to insure a more perfect fit on the automobile fender and a firmer attachment thereto. Reduction in cost in manufacturing the protecting pad with its fastening devices is also a feature of the invention.

Another feature of this improvement comprises a separate retaining bar adapted to be firmly attached to the fender and readily mounted in the pad, thus providing for securing in an especially firm and permanent manner, that edge of the pad which may possibly scrape against some obstruction.

My invention is illustrated in the drawings hereof and is hereinafter more fully explained, and the essential novel features are set out in the claims.

Figure 2:
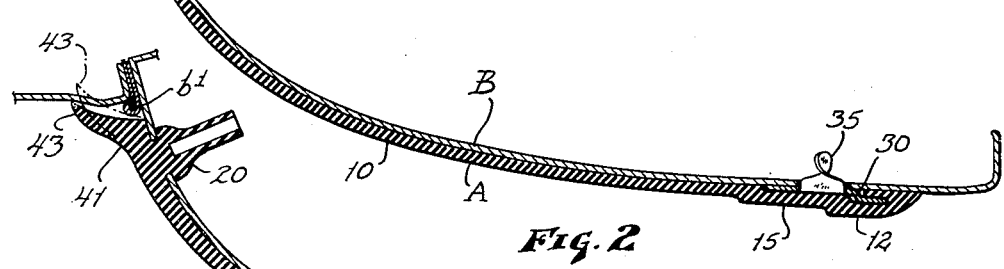
Figure 3:
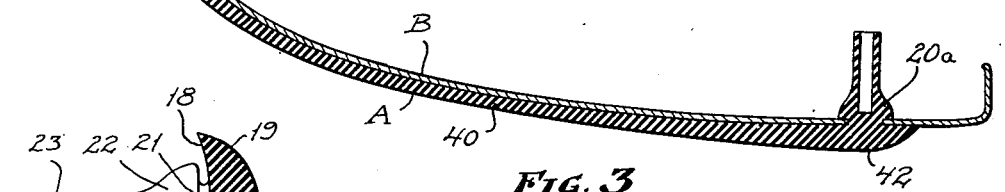
Figure 4:
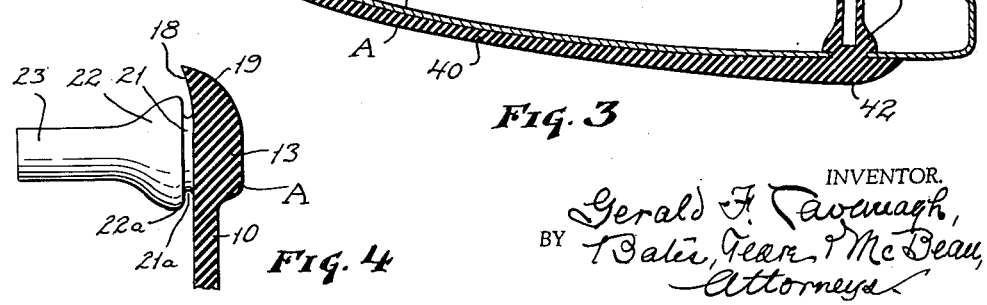
Figure 5:
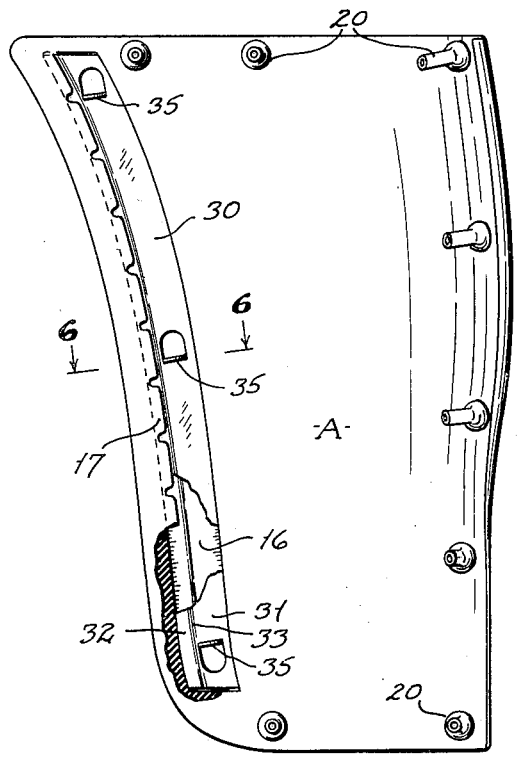
Figure 8:
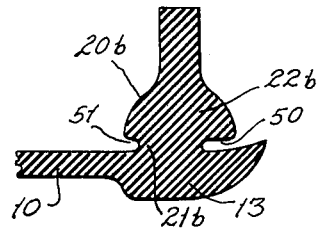
Figure 7:
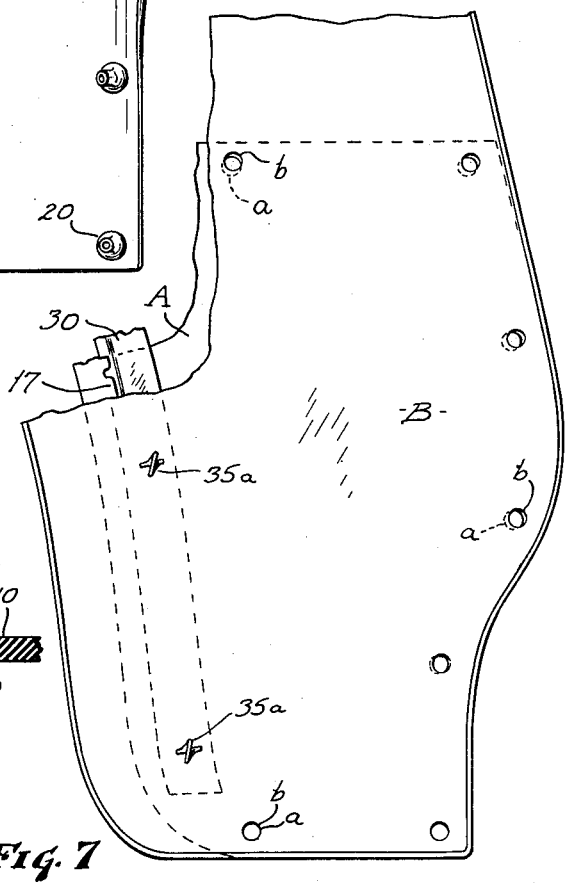
Figure 6:
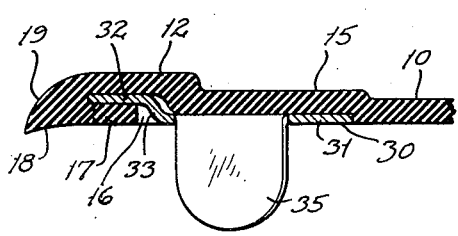

In the drawings, Fig. 1 is a perspective of a portion of an automobile, showing a rear fender which has my protective pad in place, but partly broken away; Fig. 2 is a horizontal section through the fender and pad in the plane indicated by the line 2—2 on Fig. 1 but on a larger scale; Fig. 3 is a view similar to Fig. 2 showing a modified form of a pad; Fig. 4 is a fragmentary section of the pad in the plane indicated by the line 4—4 on Fig. 1; Fig. 5 is a rear elevation of the pad shown in Fig. 1, on a larger scale and showing the retaining bar in place in the pad but partly broken away; Fig. 6 is a detail in cross section in the plane indicated by the line 6—6 on Fig. 5, but on the larger scale; Fig. 7 is in the nature of a diagram illustrating the relationship of the pad to the fender before the pad is secured in place, the view being a development of portions of the fender and pad, and Fig. 8 is a vertical section through a modified form of retaining device.

In Fig. 1, I have illustrated one form of the protecting pad designated A on the rear fender B of an automobile. The particular pad thus shown is illustrated in all of the other views except Fig. 3. This pad comprises a unitary member of yielding rubber having a comparatively thin panel 10 for the most of its extent, surrounded by comparatively thick marginal portions designated 11, 12, 13 and 14.

On the rear face of the pad behind the thickened marginal portion 11 at the inner edge and the thickened portions 13 and 14 at the bottom edge in this embodiment are rows of buttons 20, each row being parallel with the corresponding edge of the pad. Each button comprises a short substantially cylindrical neck 21 adapted to extend through an opening in the fender B and a larger substantially hemispherical head 22 extending from the neck and adapted to lie on the inner side of the fender, and a stem 23 projecting from the head. The stem 23 is preferably hollow from its extreme end to a region well within the head 22, as indicated at 24 in Fig. 2.

The open bore in the stem and head enables the collapsing of the head so that the whole button may be readily passed from the front through the opening in the fender. In ordinary use, after the pad is put in place and the stems passed through the openings in the fender, the parts are pulled into the final position, as shown in Fig. 2, by the application of a pair of pinchers to the stem at the rear of the fender and a manual pull thereon. When the buttons are in place they occupy the position shown in Fig. 2 and effectively hold the pad in such region.

For convenience of manufacture, I prefer to concave the periphery of the neck 21 and to round the corner of the head 22, as shown at 21a and 22a in Fig. 4.

In the embodiment of Fig. 1 being described, I provide a separate fastening bar for the outer edge of the fender. This bar, indicated at 30, appears in cross section in Figs. 2 and 6 and in elevation in Figs. 1, 5 and 7. The bar is a comparatively thin strip of somewhat pliable metal and has a comparatively wide longitudinal zone 31 extending laterally from one edge for the major portion of the width of the bar, a narrower zone 32 extending laterally from the other edge, two zones being offset, one from the other, by means of a connecting zone 33. From the wide zone 31, I extend suitable integral fastening tongues 35 formed by making U-shaped cuts in the metal of the strip and bending up the tongues at right angles to the body of the strip, as shown in Figs. 5 and 6.

The fastening strip described is mounted in a recess 16 formed in the body of the pad on its rear side. A portion of the pad in the form of an integral rib 17 overhangs the recess a comparatively short distance, as indicated in Fig. 6, and thus provides a pocket, leading from the recess 16, into which the narrow zone of the fastening bar may extend when the bar is in place.

The fastening strip may be firmly attached to the fender and the pad thereafter applied to the strip or the strip and pad may be put in place while the strip is in the pad, as shown in Fig. 5. In either case the tongues 35 are passed through properly positioned slots in the fender and the tongues are then twisted on themselves on the rear side of the fender, as indicated at 35a in Fig. 7, thus locking the strip to the fender with the narrow zone 32 forward of the front surface of the fender and projecting toward the outer edge thereof. The pad is thus so firmly anchored at the outer edge that it is not liable to be loosened even if scraped against some object, as in too close parking of the car.

After the strip has been put in place, and the pad is hooked over the projecting narrow zone 32 of the strip with the edge rib 17 passing behind such zone, the locking of the pad in this region is complete. Thereafter the buttons 20 at the top and bottom edges are passed through the openings in the fender and then the buttons at the inner edge are passed through openings, thus securing the pad in place, as indicated in Fig. 2.

To make a snug fit of the edges of the pad against the fender, I form such edges so that they terminate in an acute angle, which normally extends rearwardly beyond the rear face of the pad, so that when the pad is put in place with its rear face contacting with the fender, its edge portion is pressed relatively forwardly, placing the rubber under stress, which causes the edge to press against the fender. As shown in Figs. 4 and 6, the rear face of the pad adjacent the edge is concaved and bends toward the rear, as indicated at 18, while the outer face of the thickened portion is convexing at its edge, as at 19, and joins the rear face in a comparatively sharp edge located behind the general plane of the back of the pad. The parts of the pad shown in Figs. 4 and 6 are located at the top and outer edge of the pad, but the construction in this regard is similar at the bottom and inner edge. The convex edging increases the attractive appearance of the pad and gives the comparatively sharp edge desired.

By reason of the rearwardly extending comparatively sharp edges of the pad, these edges are first to contact with the fender when the pad is put in place; then, as the pad is pressed home, the rubber of the pad is distorted from its normal condition causing the pad to press at its edge firmly against the fender and maintain a tight connection, preventing the passage of water into any space between the pad and fender.

To increase the snugness of the fit of the pad on the fender, I preferably make the holes in the fender a little farther apart than the corresponding buttons on the pad, so that the pad must be given a slight stretch as it is put in place, which will maintain it perfectly smooth on the fender. This is illustrated in diagram, Fig. 7 where the holes b in the fender are shown in full lines, and the position of the buttons of the pad before they are inserted are indicated by circles a partly full and partly dotted.

With fender holes positioned as indicated in Fig. 7 and with the bottom row of buttons in place, the pad must be stretched slightly both laterally and upwardly to bring the other buttons into registration with the other holes, this stretched condition maintaining the pad perfectly smooth in use.

To accommodate a fastening strip 30 of considerable width, I prefer to offset the pad surface forwardly in the region adjacent the outer bead 12, as indicated at 15. This provides ample thickness for the pad and still leaves space for the recess on the rear face of the pad to accommodate the entire strip.

In Fig. 3 of the drawings, I have illustrated a modified form of pad. Here, instead of having an inwardly offset panel 10 of uniform thickness between the thickened marginal ribbed portions, I thicken the marginal portions, as indicated at 41 and 42, while the general body of the pad 40 is comparatively thin in the central region but gradually thickens toward the marginal portions and merges with them without interruption.

In the embodiment of Fig. 3, I have set the buttons 20 at the inner edge farther from the extreme edge than in the other embodiment, so that this edge may readily be bent outwardly and bear against the body of the car adjacent the fender, as indicated at 43. This projecting portion hides the padding b—1 between the body of the car and the fender.

In the embodiment of Fig. 3, I have secured the outer edge of the pad to the fender directly by the buttons (here designated 20a) instead of employing the metal fastener strip. These buttons are similar to those heretofore described and are located in a row adjacent the outer edge of the pad, being so positioned with reference to the holes through the fender that the pad will be slightly stretched when placed in place.

It will be seen that with either embodiment, my pad may be readily mounted on the fender. The heavy beads at the edges materially strengthen the pad, and also enables placing of a material lateral stress on the button by stretching the pad as well as an axial stress on the buttons when in place without danger of forming dimples or other marring effect on the face of the pad. By making the thickened marginal beads and the thin panel portion I lighten the article and reduce the cost thereof. The rounding of the corners on the heads of the buttons and concaving of its shank enables simpler manufacture by the use of a two plate mold.

In Fig. 8 is illustrated a modified form of button 20b possessing a greater holding power. The axis of the hemi-spherical head 22b is offset from the axis of the neck 21b in a direction toward the edge of the pad, whereby the overhang of the head is increased, in the region wherein its holding action is most effective, without reducing the size of the neck or enlarging the head. As illustrated in Fig. 8, I prefer to so offset the two axes that the overhang or shoulder at 50 is approximately three times as great as at 51. The increased holding power thus obtained is of considerable advantage where rubber or composition of low mechanical strength is to be used.

I claim:

1. A rubber pad for automobile fenders, comprising a body having comparatively thick marginal portions and a panel portion which is compartively thin in the central region and is gradually thickened outwardly to have its face merge with the faces of the marginal portions, and rubber buttons integral with the pad extending rearwardly from the thickened marginal portions and adapted to secure the pad to the fender, said button having retaining shoulders comprising surfaces extending substantially parallel to the surface of the fender to which it is to be applied.

2. A protective device for automobile fenders comprising a removable pad of vulcanized rubber or similar elastic material adapted to rest against the front face of the fender, and buttons integral with the pad projecting from the rear face of the pad and each having a stem thereon to provide a gripping portion whereby the button may be drawn through aligned openings in the fender and to expand therebeyond to prevent withdrawal, said buttons having a neck and an enlarged head, the axis of the head being offset from the axis of the neck whereby an enlarged shoulder is formed to engage the rear face of the fender, and said buttons having retaining shoulders comprising surfaces extending substantially parallel to the surface of the fender to which it is to be applied.

3. The combination of an automobile fender having an attached strip with a projecting edge spaced from the face of the fender, a removable pad having near one edge an undercut recess adapted to receive said projecting edge of the strip, and a row of spaced devices for fastening the opposite edge of the pad to hold the free edge snugly on the strip with the body of the pad against the fender.

4. The combination with an automobile fender having openings through it, a strip on one face of the fender having integral tongues cut out from the body of the strip and turned therefrom, said tongues passing through the fender and being twisted on the opposite face thereof to bind the strip in place, the strip having an edge offset away from the fender, and a removable yielding pad adapted to rest against the first mentioned face of the fender and having a recess adjacent one edge of the pad to receive the strip and having a projecting rib to engage behind the offset edge of such strip, and projecting buttons along the other edges of the pad adapted to be passed through openings in the fender to hold the pad thereto.

5. A protective pad for automobile fenders comprising a rubber body having adjacent one edge a rearwardly open longitudinal recess, inwardly joining a lateral longitudinal extension in front of a portion of the pad, said extension being formed to receive a fastening device secured to one face of the fender having a projecting edge spaced from the fender, said pad having adjacent another edge projecting buttons adapted to be passed through openings in the fender and having enlarged heads to engage the other face of the fender after such passage.

GERALD F. CAVANAGH.